March 29, 1932.     J. FRIZNER     1,851,825
LICENSE PLATE HOLDER
Filed March 3, 1931
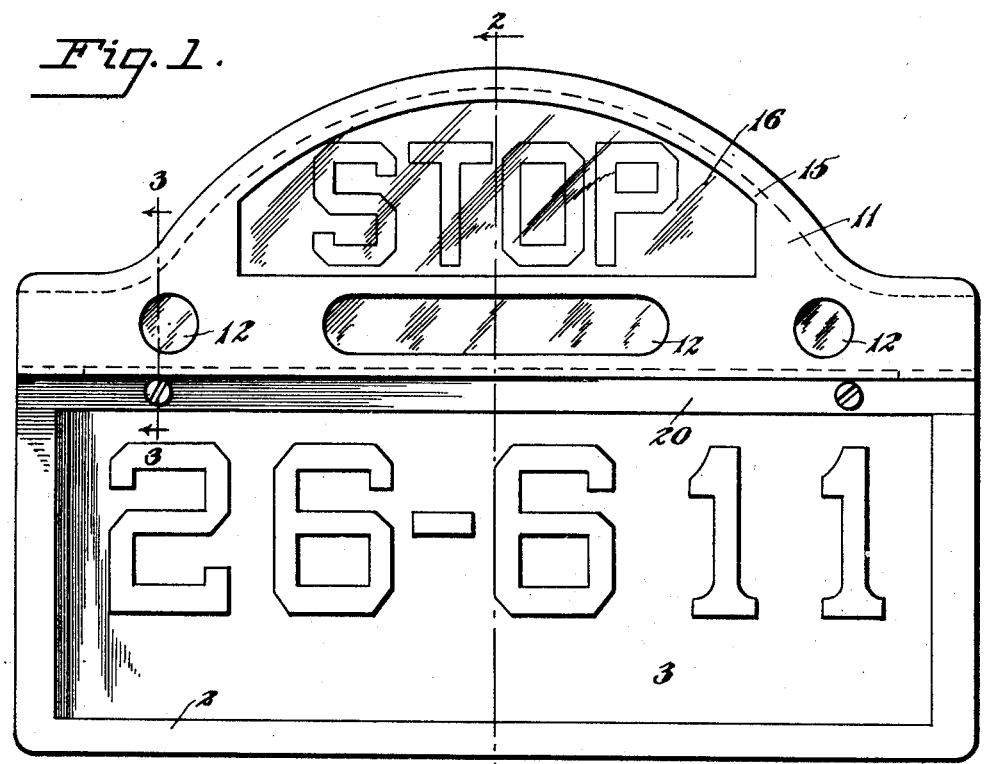
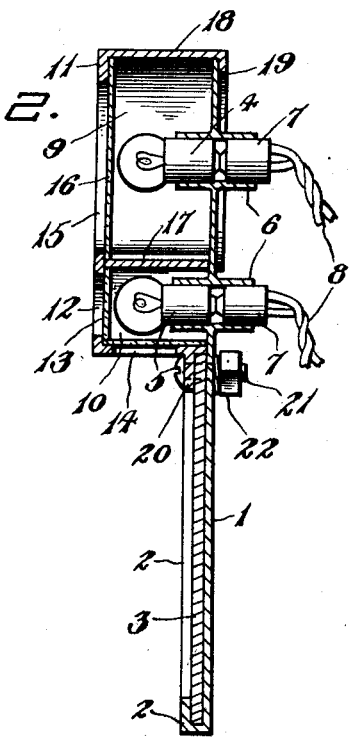
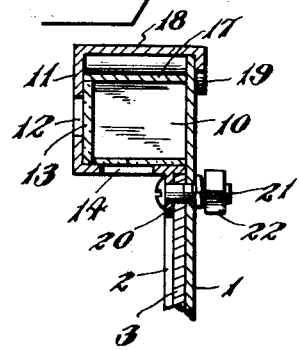
Inventor
John Frizner
By Lacey+Lacey,
Attorneys Patented Mar. 29, 1932

1,851,825

UNITED STATES PATENT OFFICE

JOHN FRIZNER, OF DETROIT, MICHIGAN

LICENSE PLATE HOLDER

Application filed March 3, 1931. Serial No. 519,819.

This invention seeks to provide a simple, inexpensive and efficient structure whereby an automobile license plate will be firmly held in proper position upon the car, and lights for illuminating the license plate and for giving a stop signal will be properly supported to perform their functions. The invention provides a structure which is light and which may be easily manipulated to facilitate the placing of the license plate in position therein. The invention is illustrated in the accompanying drawings and consists in certain novel features which will be particularly pointed out in the claims following a detailed description.

In the drawings:—

Figure 1 is an elevation of a device embodying the invention,

Fig. 2 is a transverse section on the line 2—2 of Fig. 1, and

Fig. 3 is a somewhat enlarged detail section on the line 3—3 of Fig. 1.

In carrying out the invention, there is provided a back plate 1 which is provided on its outer face along its lower edge and the lower portion of its end edges with a rim or flange 2, formed by doubling the material of the back plate upon itself whereby a groove is formed to receive the edges of the license plate 3. The upper portion of the back plate extends upwardly beyond the upper extremities of the side portions of the flange 2 and is suitably shaped to accommodate signal lamps, indicated at 4 and 5, tubular holders 6 being formed on the back plate, preferably integral therewith, to receive the lamps and socket members 7 carrying cords 8 through which current may be fed to the lamps to energize the same. The lamps will be controlled in the manner now generally practiced, the tail lamp 5 being controlled by a switch upon the instrument board of the vehicle or otherwise accessible to the chauffeur, and the stop signal lamp 4 being controlled by the operation of the brakes in a well-known manner. Cooperating with the upper portion of the back plate 1 is a frame structure of such form as to provide a box or chamber 9 receiving the stop signal lamp 4, and a lower box or chamber 10 receiving the tail light 5. This frame has a front plate 11 having openings 12 in its lower portion which are preferably disposed as shown in Fig. 1, and includes a central elongated opening and smaller circular openings spaced from the ends of the central opening. These openings are glazed, as indicated at 13, and the glazing material is preferably colored green so that they will have a distinctive appearance and may be easily seen by approaching motorists. The bottom of the lower box 10 is provided with an opening 14 therethrough which extends from end to end of the box and is likewise glazed, the glazing material being preferably clear, as this opening is provided to permit illumination of the license plate. A large opening 15 is formed through the upper portion of the front plate 11 and this opening is also glazed, the glazing material 16 being colored red and preferably displaying the word "Stop", as shown in Fig. 1. This upper portion or box 9 will be illuminated only when the vehicle is about to stop, and serves as a danger signal so that vehicles in the rear of the vehicle displaying the signal will be enabled to avoid collision. The frame 11 is provided with a partition 17 extending from end to end of the frame and serving as a dividing means between the upper and lower boxes or chambers 9 and 10. The frame is closed at its ends and also has a cover member 18 which is suitably shaped to conform to the outline of the upper edge of the back plate, and along the rear edge of this cover or roof is a depending flange or rim 19 which fits closely against the rear side of the back plate 1, as shown clearly in Figs. 2 and 3. The frame is so proportioned that its bottom will extend over and may bear on the upper edge of the license plate, as shown in Figs. 2 and 3, and thereby prevent the license plate rising from its seat in the holder and being lost. Spaced from the rear extremity of the bottom of the frame a distance sufficient to accommodate the thickness of the license plate is a depending rim or flange 20 having openings formed therethrough and so located as to aline axially with openings through the back plate and through the upper marginal portion of the license plate, bolts 21 being fitted through the openings, and nuts 22 being mounted on said bolts so as to be turned home against the back plate and thereby firmly secure the upper frame or box member, the back plate and the license plate together. As shown clearly in Figs. 2 and 3, the flange 20 is preferably integral with the frame which forms the signal housing.

Ordinarily, there will be no necessity for separating the upper box forming frame from the back plate, but if it should be necessary to renew the lamps or bulbs, the bolts 21 are loosened and withdrawn and the box is then lifted upwardly from the back plate until the rim or flange 19 clears the upper edge thereof, whereupon the lamp sockets will be accessible and new lamps may be easily fitted therein. When the license plate is to be changed, the upper frame or box forming member is removed, as just described, whereupon the dead license plate may be lifted from its place and the new license plate slipped downwardly behind the rim 2 in an obvious manner, whereupon the box is returned to place and the bolts 21 again secured. It will be understood, of course, that the bolts 21 not only secure the license plate and the parts of the holder together but also secure the holder in position upon the automobile frame.

The device is exceedingly simple in its construction and arrangement of parts and may be produced at a low cost. There is nothing about the device to get out of order and it will, therefore, be found exceedingly durable. It is intended to have devices mounted upon the vehicle, one at the rear and one at the front, and the front holder will, when illuminated, definitely inform motorists, approaching at night, of the exact position of the vehicle upon the road so that side swiping collisions may be easily avoided. The front holder will be a duplicate of the one at the rear except that the stop signal will be omitted, the lamps for illuminating the license plate being in the same circuit as the lamps 5 in the rear holder.

Having thus described the invention, I claim:

1. A device for the purpose set forth comprising a back plate provided with an offset flange along its lower edge and at its end edges adapted to receive a license plate, a signal box member disposed against the upper portion of the back plate with its bottom extending across the upper edge of the license plate whereby to retain the license plate in the flange on the back plate, said box member having an element depending from its bottom in front of the license plate, and fastening devices inserted through said depending element, the back plate and the license plate whereby to secure all of the parts together.

2. A device for the purpose set forth comprising a back plate provided on its front face at its lower portion with means for supporting a license plate and provided in its upper portion with means for supporting signal lamps, an upper frame member defining compartments housing the respective signal lamps and having distinctive glazed openings through its side and also provided with an opening through its bottom whereby to effect illumination of a license plate below the same, means for securing said upper frame member to the back plate, and a depending rim along the top of said upper frame member at the rear thereof to engage over the upper edge and against the rear side of the back plate.

3. A device for the purpose set forth comprising a back plate provided at its upper portion with means for supporting signal lamps, an upper frame member defining compartments housing the respective signal lamps and provided on its bottom with a depending flange spaced from the back plate, means for clamping a license plate between said flange and the back plate, and a depending rim along the top of said upper frame member at the rear thereof to engage over the upper edge and against the rear side of the back plate.

In testimony whereof I affix my signature.

JOHN FRIZNER. [L. S.]